United States Patent [19]
Lee et al.

[11] Patent Number: 5,361,294
[45] Date of Patent: Nov. 1, 1994

[54] METHOD AND APPARATUS FOR NOISE QUIETING DURING RESYNCHRONIZATION OF A DIGITAL COMMUNICATION SYSTEM

[75] Inventors: Craig A. Lee, Boynton Beach; Thomas A. Oberle, Boca Raton, both of Fla.

[73] Assignee: Motorola, Inc., Schaumburg, Ill.

[21] Appl. No.: 993,881

[22] Filed: Dec. 23, 1992

[51] Int. Cl.$^5$ .......................................... H04M 11/00
[52] U.S. Cl. ........................................ 379/58; 379/63; 370/29
[58] Field of Search ........................ 379/58, 59, 61, 63; 455/33.1, 51.1, 54.1, 63; 370/29

[56] References Cited

U.S. PATENT DOCUMENTS

| | | | |
|---|---|---|---|
| 5,103,448 | 4/1992 | Barnes et al. | 379/61 |
| 5,228,026 | 7/1993 | Albrow | 377/63 |
| 5,280,541 | 1/1994 | Marko et al. | 379/61 |

OTHER PUBLICATIONS

European Telecommunications Standards Institute, "CT2 Common Air Interface", Version 1.1, Document No. I-ETS 300 131:1990, 30th Jun., 1990, Valbonne Cedex, France.

*Primary Examiner*—Curtis Kuntz
*Assistant Examiner*—Dwayne D. Bost
*Attorney, Agent, or Firm*—R. Louis Breeden; Thomas G. Berry

[57] ABSTRACT

A method and apparatus eliminates an audible noise burst after reestablishment of an external timing signal in a radio base station (102). After a loss of the external timing signal, the base station (102) temporarily operates from an internal timing signal generator (226) to provide digital communications over a radio link (106) with a portable communication unit (120). After reestablishment of the external timing signal, the base station (102) detects (304) the presence of the signal, waits (306) for the signal to stabilize, and controls (312) the portable communication unit (120) to disable audio while switching (316) back to the external timing signal.

14 Claims, 4 Drawing Sheets

METHOD AND APPARATUS FOR NOISE QUIETING DURING RESYNCHRONIZATION OF A DIGITAL COMMUNICATION SYSTEM

FIELD OF THE INVENTION

This invention relates in general to radio communication systems, and more specifically to a method and apparatus for noise quieting during resynchronization of a digital communication system.

BACKGROUND OF THE INVENTION

Two-way digital wireless communication systems that are coupled to the public switched telephone network (PSTN) are well known. An example is the S35XGB1602AP telepoint base station used with the S35XCD1000AA personal telephone, both manufactured by Motorola, Inc. of Schaumburg, Ill. That system typically comprises a plurality of the telepoint base stations at a plurality of telepoint sites. A transceiver in the telepoint base station communicates with a personal telephone by means of a well-known synchronous, time-division-duplex (TDD) communication protocol referred to as the CT2 protocol. The CT2 protocol specifies a TDD timing such that the base station and the personal telephone must alternately transmit for one-millisecond and then receive for one millisecond. For further information on the CT2 protocol one is referred to "CT2 Common Air Interface," Version 1.1, document number IETS 300 131:1990, published 30th Jun., 1991, by the European Telecommunications Standards Institute (ETSI), of Valbonne Cedex, France.

A typical large city requires thousands of telepoint sites for good coverage. Because radio coverage of one site can overlap with the radio coverage of another site, it is preferable that the TDD communications of the sites be synchronized with one another for best performance. That is, it is preferable that all base station sites transmit simultaneously and receive simultaneously, else communication range becomes somewhat compromised due to mutual interference.

To synchronize the base stations a master timing signal is generated and typically is distributed over a wireline network to a synchronization port on the base station. Occasionally, a problem occurs somewhere in the system, causing loss of the master timing signal. When this happens, the TDD timing of each base station has to be generated internally, and the system is no longer synchronized. Unfortunately, when the master timing signal is later restored, a resultant sudden shift in timing signal edges can cause a loud audio noise burst in the conventional system. The loud audio noise burst is audible in both communication directions and has been a source of user complaints in existing CT2 systems.

Thus, what is needed is a method of preventing the audible noise burst that has typically occurred during restoration of an interrupted master timing signal in a CT2 system.

SUMMARY OF THE INVENTION

An aspect of the present invention is a method of eliminating an audible noise burst after reestablishment of an external timing signal in a radio base station temporarily operating from an internal timing signal to provide digital communications over a radio link with a portable communication unit. The base station is coupled to a telephone system. The method comprises the step of detecting in the base station the reestablishment of the external timing signal, comprising the step of receiving an indication that the external timing signal is present. The detecting step further comprises the steps of withholding response for a first predetermined time delay after receiving the indication, and reconfirming that the external timing signal is still present after the withholding step. The method further comprises the step of controlling from the base station the portable communication unit to execute a radio link reestablishment procedure in response to the detecting step.

Another aspect of the present invention is a method of eliminating an audible noise burst after reestablishment of an external timing signal in a radio base station temporarily operating from an internal timing signal to provide digital communications over a radio link with a portable communication unit operated by a user. The base station is coupled to a telephone system. The method comprises the step of detecting in the base station the reestablishment of the external timing signal, comprising the step of receiving an indication that the external timing signal is present. The detecting step further comprises the steps of withholding response for a first predetermined time delay after receiving the indication, and reconfirming that the external timing signal is still present after the withholding step. The method further comprises the step of controlling from the base station the portable communication unit to disable audio transmitted to the user in response to the detecting step.

A third aspect of the present invention is an apparatus in a radio base station for eliminating an audible noise burst after reestablishment of an external timing signal, the radio base station temporarily operating from an internal timing signal to provide digital communications over a radio link with a portable communication unit operated by a user. The base station also is coupled to a telephone system. The apparatus comprises a detection element for detecting the reestablishment of the external timing signal, the detection element comprising a receiving means for receiving an indication that the external timing signal is present. The detection element further comprises a delay element coupled to the receiving element for delaying response for a first predetermined time delay after receiving the indication, and a reconfirming element coupled to the delay element for reconfirming that the external timing signal is still present after the first predetermined time delay. The apparatus further comprises a first control element coupled to the detection element for controlling the portable communication unit to disable audio transmitted to the user in response to reconfirming that the external timing signal is still present after the first predetermined time delay.

A fourth aspect of the present invention is a telepoint base station for communicating with a portable communication unit. The telepoint base station comprises a radio transceiver for establishing a radio link with the portable communication unit, and a processor coupled to the radio transceiver for controlling the telepoint base station. The telepoint base station further comprises a memory coupled to the processor for storing system software and operating variables, and a telephone interface coupled to the radio transceiver for providing communications between the portable communication unit and a telephone system. The telepoint base station also includes an external timing port coupled to the processor for receiving an external timing signal, and an internal timing signal generator coupled to the processor for generating an internal timing signal. In addition, the telepoint base station includes an apparatus for eliminating an audible noise burst after reestablishment of the external timing signal when the telepoint base station is temporarily operating from the internal timing signal to provide digital communications with the portable communication unit. The apparatus comprises an external timing signal detector for detecting the reestablishment of the external timing signal, the external timing signal detector comprising a logic signal input element for receiving an indication that the external timing signal is present. The external timing signal detector also includes a delay element coupled to the logic signal input element for delaying response for a first predetermined time delay after receiving the indication, and a reconfirmation element coupled to the delay element for reconfirming that the external timing signal is still present after the first predetermined time delay. The apparatus further comprises a first processor element coupled to the external timing signal detector for controlling the portable communication unit to execute a radio link reestablishment procedure in response to reconfirming that the external timing signal is still present after the first predetermined time delay.

DESCRIPTION OF THE PREFERRED EMBODIMENT

Figure 1:
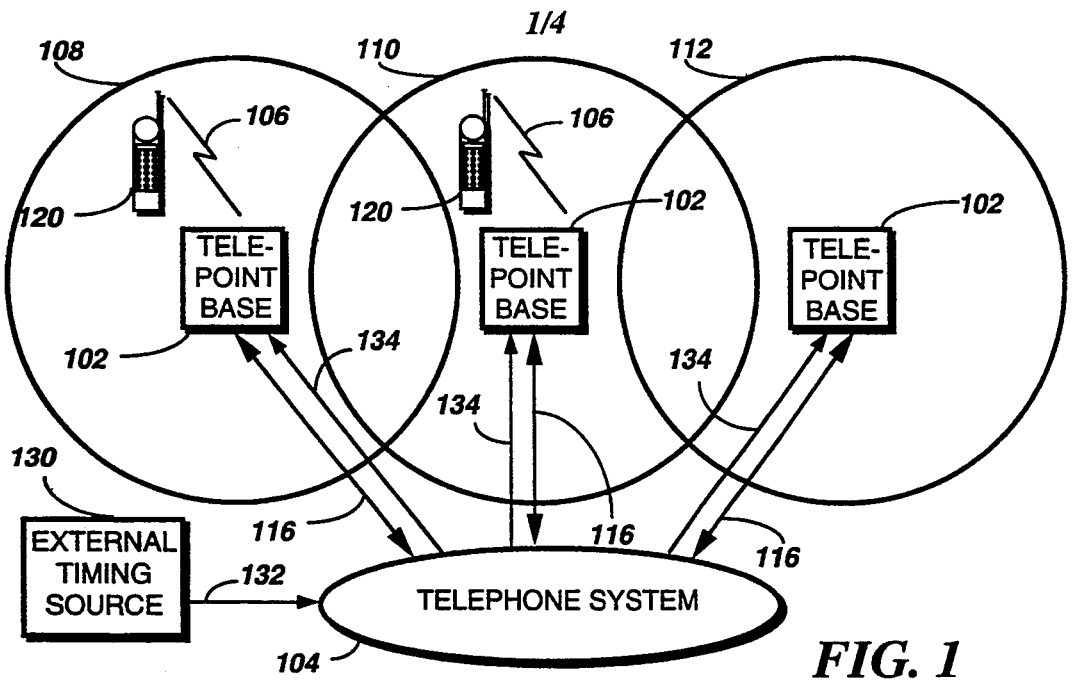
FIG. 1 is an electrical block diagram of a communication system in accordance with the preferred embodiment of the present invention.

Referring to FIG. 1, an electrical block diagram of a communication system in accordance with the preferred embodiment of the present invention comprises telepoint base stations 102 coupled to a telephone system 104 by telephone lines 116. The telepoint base stations 102 are coupled to portable communication units 120 by radio frequency (RF) links 106. The telepoint base stations 102 provide radio coverage within geographically separate radio coverage areas, such as coverage areas 108, 110, 112. An external timing source 130 is coupled to the telephone system 104 by a line 132 and from there to the telepoint base stations 102 by external timing signal lines 134. The external timing source 130 is for synchronizing time-division duplex (TDD) digital communications used by the telepoint base stations 102. Maintaining synchronization of the TDD communications maximizes the range over which the communications can take place.

The telephone system 104, the external timing source 130, and the portable communication units 120 are conventional and well known in the art. The external timing source 130 and the portable communication units 120 are preferably from the Silverlink ™ family of CT2 products available from Motorola, Inc. of Schaumburg, Ill. It will be appreciated that other similar products may be used as well.

Figure 2:
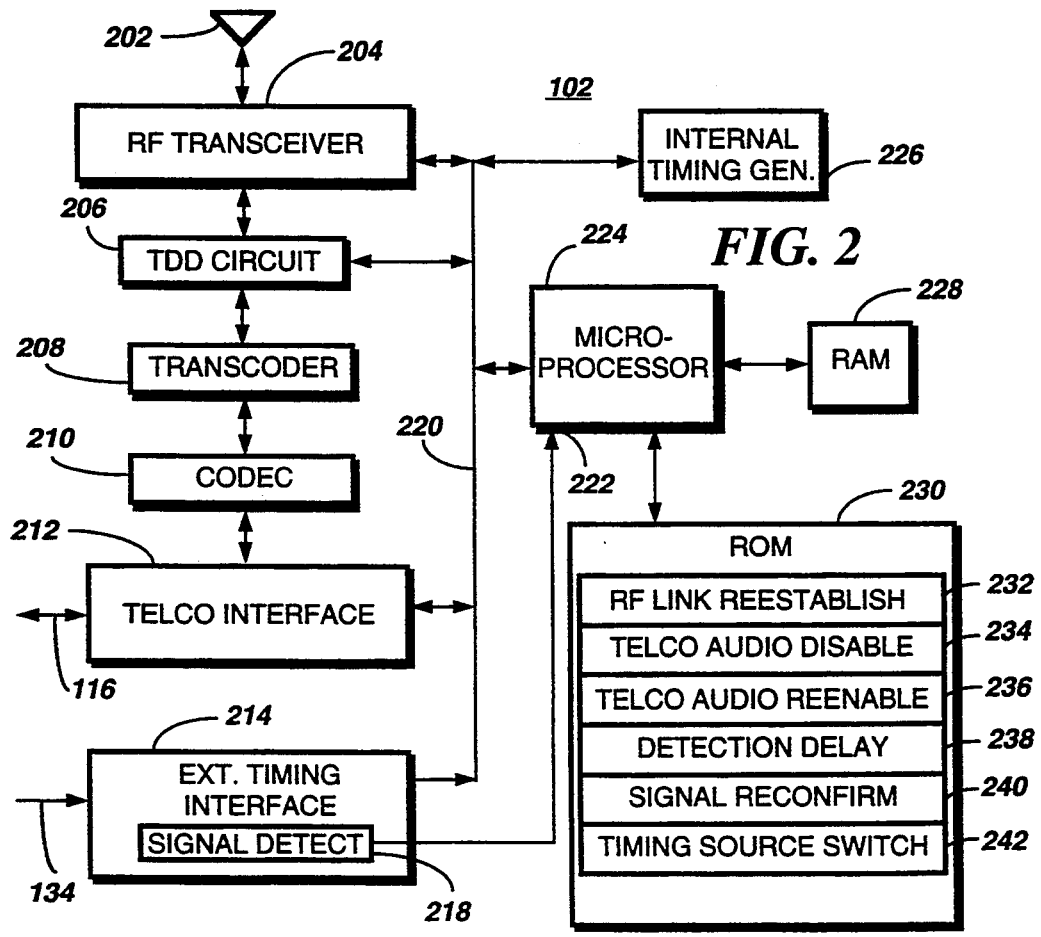
FIG. 2 is an electrical block diagram of a telepoint base station in accordance with the preferred embodiment of the present invention.

Referring to FIG. 2, an electrical block diagram of the telepoint base station 102 in accordance with the preferred embodiment of the present invention comprises an antenna 202 for sending and intercepting the TDD communications. The antenna 202 is coupled to an RF transceiver 204 for transmitting and receiving the TDD communications. The RF transceiver 204 is coupled to a TDD circuit 206 for converting between TDD signaling of the RF transceiver 204 and space-division-duplex signaling of a transcoder 208. Preferably, the TDD circuit 206 performs compatibly with the second generation cordless telephony (CT2) TDD transmit and receive intervals of one millisecond each, although other TDD transmit and receive intervals could be used as well.

The transcoder 208 is coupled to the TDD circuit 206 for converting between adaptive differential pulse code modulation (ADPCM) signaling of the TDD circuit 206 and pulse code modulation (PCM) signaling of a coder/decoder (CODEC) 210 also coupled to the transcoder 208 for converting between the digital PCM signaling of the transcoder 208 and analog signaling of a telephone company (TELCO) interface circuit 212. The TELCO interface circuit 212 is coupled to one of the telephone lines 116 for communicating with the telephone system 104, and is coupled to the CODEC 210 for providing well-known telephone interface functions such as line supervision, incoming call detection, telephone address signaling, etc.

An external timing interface 214 is coupled to one of the external timing signal lines 134 for receiving an external timing signal from the external timing source 130. The external timing interface 214 comprises a signal detect element 218 for indicating detection of the external timing signal to a microprocessor 224 at an input port 222. The TELCO interface circuit 212, the TDD circuit 206, the RF transceiver 204, and the external timing interface 214 are coupled to a bus 220 for control by and communication with the microprocessor 224. The bus 220 is also coupled to an internal timing generator 226 for control and generation of TDD timing in the absence of the external timing signal. In addition, a random access memory (RAM) 228 is coupled to the microprocessor 224 for storing temporary operating values.

The elements 202, 204, 206, 208, 210, 212, 214, 218, 220, 222, 224, 226, and 228 of the electrical block diagram of the telepoint base station 102 described above preferably comprise components of the S35XGB1602AP telepoint base station with optional sync board NTN6085C, both available from Motorola, Inc. of Schaumburg, Ill. It will be appreciated that other similar components may be substituted as well.

A read-only memory (ROM) 230 is coupled to the microprocessor 224 for storing pre-programmed executable firmware elements used to control operation of the telepoint base station 102 in accordance with the preferred embodiment of the present invention. The firmware elements comprise an RF Link Reestablish element 232 for generating a command to the portable communication units 120 to drop and then reestablish active RF links 106. A TELCO Audio Disable element 234 provides for disabling audio sent to the telephone system during RF link reestablishment. A TELCO Audio Reenable element 236 provides for reenabling the audio sent to the telephone system following RF link reestablishment. A Detection Delay element 238 delays a response to a timing signal detect indication from the signal detect element 218 for a predetermined time delay to ensure signal stability. A Signal Reconfirm element 240 reconfirms presence of the external timing signal after the predetermined time delay. A Timing Source Switch element 242 switches between the external timing source 130 and the internal timing generator 226 to select a source of TDD timing. Operation of the firmware elements 232, 234, 236, 238, 240, and 242 is described further below. It will be appreciated that the ROM 230 and the RAM 228 may also be implemented as a contiguous part of the microprocessor 224 as well.

Figure 3:
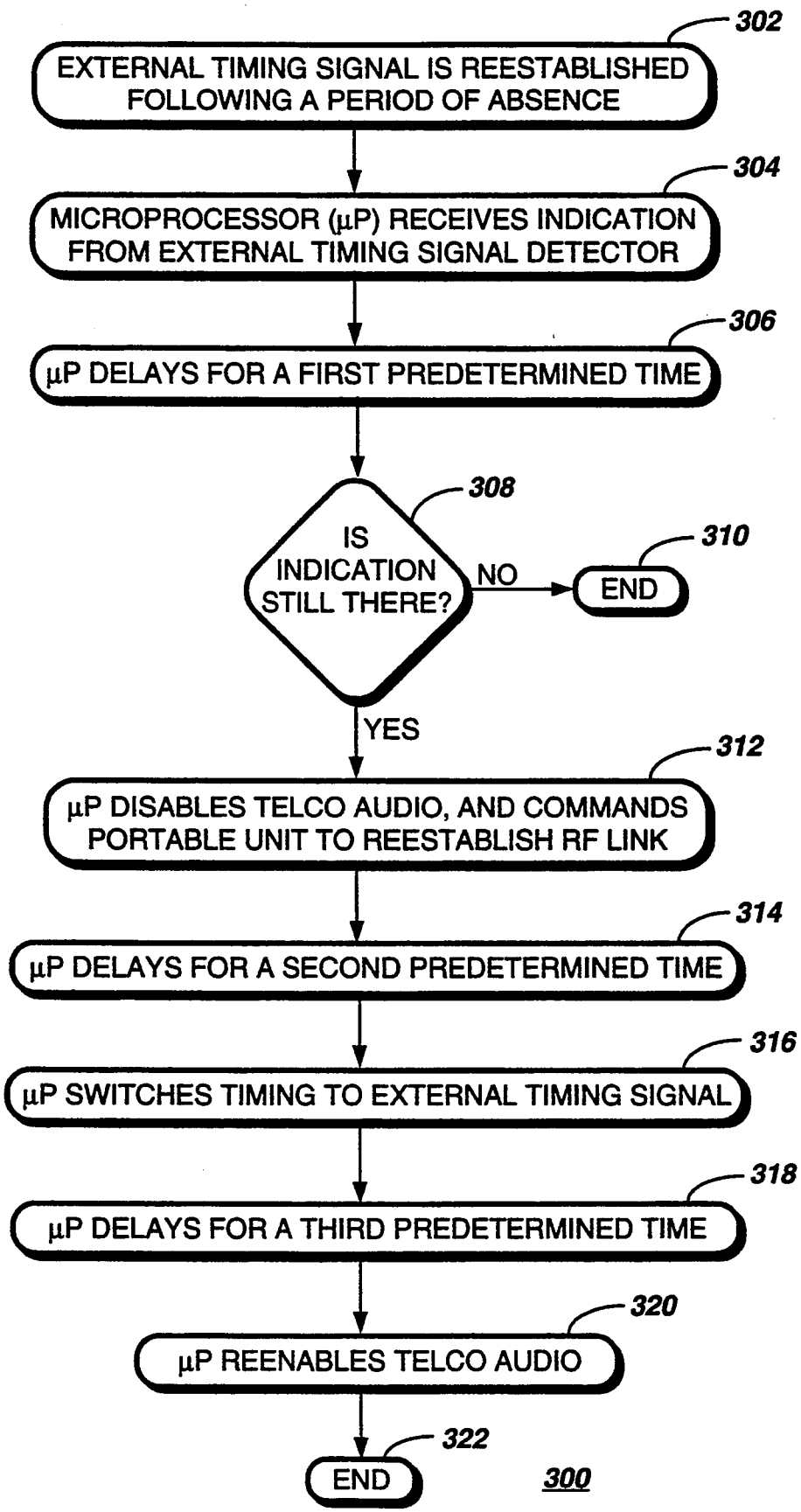
FIG. 3 is a flow chart of the operation of the telepoint base station in accordance with the preferred embodiment of the present invention.

Referring to FIG. 3, a flow chart 300 of the operation of the telepoint base station 102 in accordance with the preferred embodiment of the present invention begins with a reestablishment 302 of the external timing signal following a period of absence. The microprocessor 224 then receives 304 an indication at the input port 222 that the signal detect element 218 has detected the external timing signal. Next, the microprocessor 224 accesses the Detection Delay element 238 in the ROM 230 and delays 306 further action for a first predetermined time delay, e.g., fifty milliseconds, to ensure stability of the external timing signal before taking action on the detection.

Following the delay, the microprocessor 224 accesses the Signal Reconfirm element 240 to check 308 whether the indication from the signal detect element 218 is still present at the input port 222. If not, the process ends 310. If the indication is still present at step 308, then the microprocessor 224 accesses the TELCO Audio Disable element 234 and disables 312 the TELCO audio. In step 312 the microprocessor 224 also accesses the RF Link Reestablish element 232 and commands the portable communication units 120 active on the telepoint base station 102 to drop and then reestablish the RF links 106. In the CT2 protocol a well-known link reestablishment command requires a portable communication unit 120 receiving the command to mute audio sent to the user until link reestablishment is completed. The audio muting during link reestablishment advantageously prevents any noise resulting from changing from the internal timing generator 226 to the external timing source 130 after the portable communication unit 120 has responded to the link reestablishment command.

To allow time for the portable communication units 120 to respond to the command, the microprocessor 224 delays 314 further action for a second predetermined time delay, e.g., fifty milliseconds. Then the microprocessor 224 accesses the Timing Source Switch element 242 and switches 316 to the external timing signal. Next, the microprocessor 224 delays 318 further action for a third predetermined time delay, e.g., three-hundred-fifty milliseconds, to allow the link reestablishment started earlier to complete. Then the microprocessor 224 accesses the TELCO Audio Reenable element 236 and reenables 320 the TELCO audio, after which the process ends 322.

Figure 4:
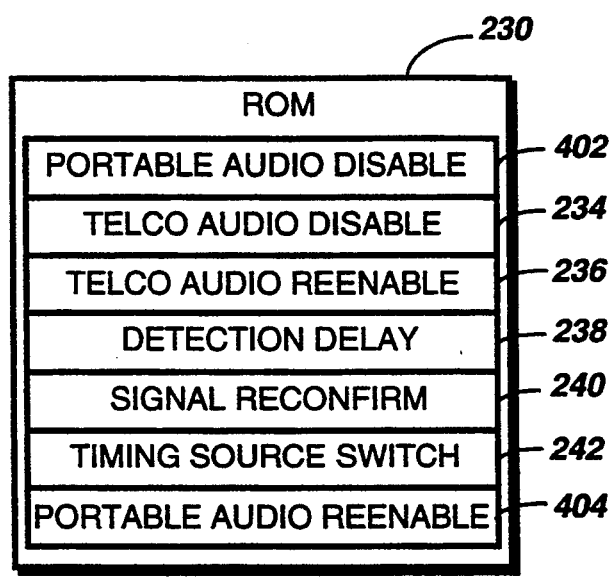
FIG. 4 is a firmware block diagram of firmware pre-programmed into a read-only memory in accordance with an alternate embodiment of the present invention.

With reference to FIG. 4, a firmware block diagram 400 of firmware preprogrammed into the ROM 230 in accordance with an alternate embodiment of the present invention is depicted. The essential difference between the firmware block diagram 400 and the block diagram of firmware elements depicted in FIG. 2 for the ROM 230 in accordance with the preferred embodiment of the present invention is the replacement of the RF Link Reestablish element 232 by a Portable Audio Disable element 402 and a Portable Audio Reenable element 404. The firmware elements 402 and 404 control audio muting for the portable communication units 120 during link resynchronization without necessarily reestablishing the RF link 106, as described below.

Figure 5:
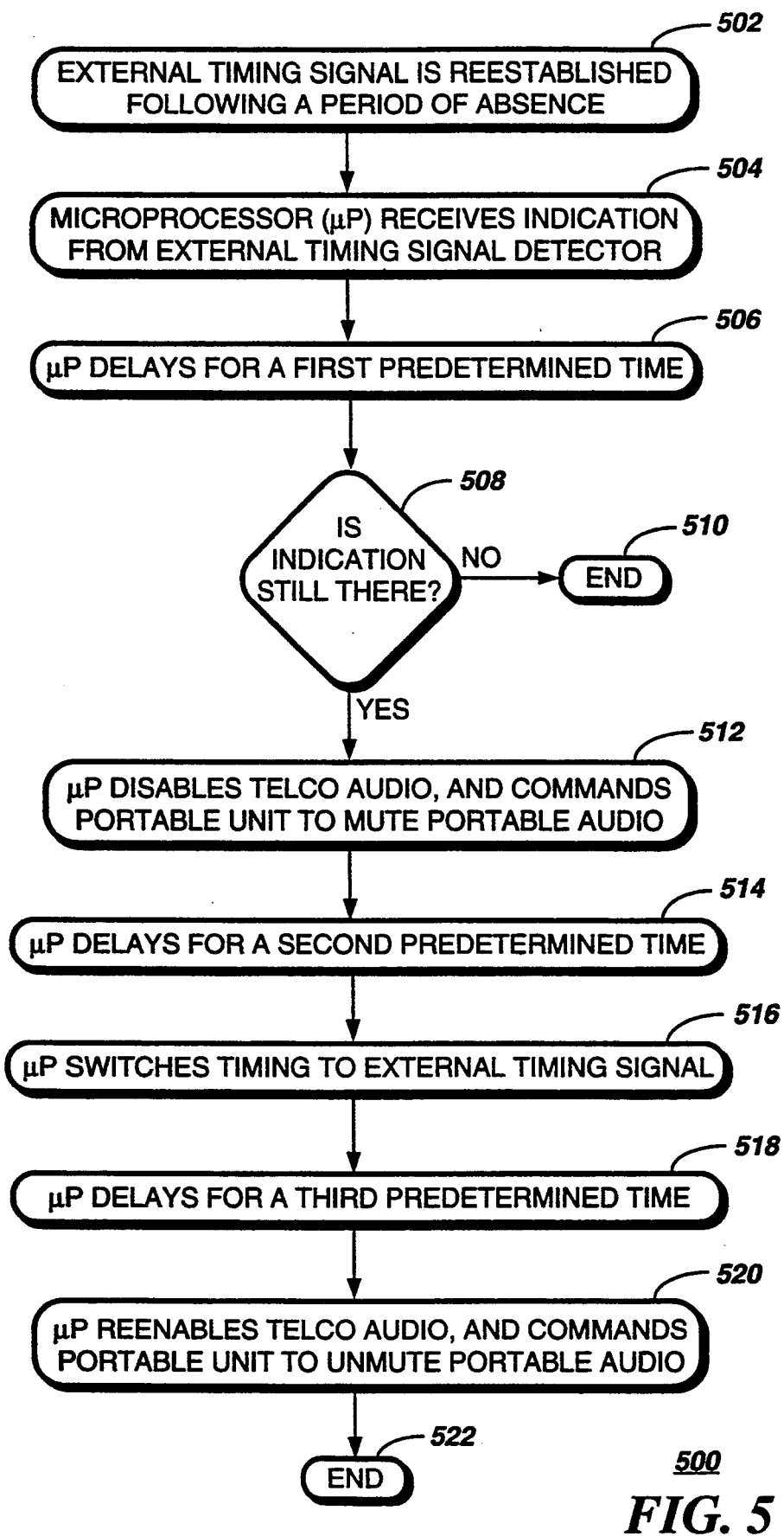
FIG. 5 is a flow chart of the operation of the telepoint base station in accordance with the alternate embodiment of the present invention.

With reference to FIG. 5, a flow chart 500 of the operation of the telepoint base station 102 when preprogrammed with the firmware depicted in the firmware block diagram 400 in accordance with the alternate embodiment of the present invention begins with a reestablishment 502 of the external timing signal following a period of absence. The microprocessor 224 then receives 504 an indication at the input port 222 that the signal detect element 218 has detected the external timing signal. Next, the microprocessor 224 accesses the Detection Delay element 238 in the ROM 230 and delays 506 further action for a first predetermined time delay, e.g., fifty milliseconds, to ensure stability of the external timing signal before taking action on the detection.

Following the delay, the microprocessor 224 accesses the Signal Reconfirm element 240 to check 508 whether the indication from the signal detect element 218 is still present at the input port 222. If not, the process ends 510. If the indication is still present in step 508, then the microprocessor 224 accesses the TELCO Audio Disable element 234 and disables 512 the TELCO audio. In step 512 the microprocessor 224 also accesses the Portable Audio Disable element 402, and uses a well-known channel control (CC) command of the CT2 protocol to control the portable communication units 120 active on the telepoint base station 102 to mute audio to the users without necessarily breaking and then reestablishing the RF link 106. The audio muting advantageously prevents any noise resulting from changing from the internal timing generator 226 to the external timing source 130 after the portable communication units 120 have responded to the mute command.

To allow time for the portable communication units 120 to respond to the command, the microprocessor 224 delays 514 further action for a second predetermined time delay, e.g., fifty milliseconds. Then the microprocessor 224 accesses the Timing Source Switch element 242 and switches 516 to the external timing signal. Next, the microprocessor 224 delays 518 further action for a third predetermined time delay, e.g., three-hundred-fifty milliseconds, to allow the portable communication units 120 to resynchronize with the external timing signal, and to reestablish any RF links 106 broken by the sudden change to the external timing signal. Then the microprocessor 224 accesses the TELCO Audio Reenable element 236 and reenables 520 the TELCO audio. In addition, in step 520 the microprocessor 224 accesses the Portable Audio Reenable element 404 and uses the CC command to control the portable communication units 120 to unmute the portable audio, after which the process ends 522.

Thus, the present invention provides a method and apparatus for preventing the audible noise burst that has typically resulted from restoration of an interrupted master timing signal in a digital communication system. The present invention advantageously provides a method of preventing the audible noise burst both with and without a requirement for breaking and then reestablishing the RF link.

We claim:

1. A method of eliminating an audible noise burst after reestablishment of an external timing signal in a radio base station temporarily operating from an internal timing signal to provide digital communications over a radio link with a portable communication unit, the base station being coupled to a telephone system, the method comprising the steps of:
  detecting in the base station the reestablishment of the external timing signal, comprising the steps of:
    receiving an indication that the external timing signal is present;
    withholding response for a first predetermined time delay after receiving the indication; and
    reconfirming that the external timing signal is still present after the withholding step; and
  controlling from the base station the portable communication unit to execute a radio link reestablishment procedure in response to the detecting step.

2. The method in accordance with claim 1, further comprising the step of:
  switching base station timing from the internal timing signal to the external timing signal a second predetermined time delay after the controlling step.

3. The method in accordance with claim 1, further comprising the steps of:
  disabling, concurrently with the controlling step, audio transmitted to the telephone system; and
  reenabling the audio transmitted to the telephone system concurrently with completion of the radio link reestablishment procedure.

4. A method of eliminating an audible noise burst after reestablishment of an external timing signal in a radio base station temporarily operating from an internal timing signal to provide digital communications over a radio link with a portable communication unit operated by a user, the base station being coupled to a telephone system, the method comprising the steps of:
  detecting in the base station the reestablishment of the external timing signal, comprising the steps of:
    receiving an indication that the external timing signal is present;
    withholding response for a first predetermined time delay after receiving the indication; and
    reconfirming that the external timing signal is still present after the withholding step; and
  controlling from the base station the portable communication unit to disable audio transmitted to the user in response to the detecting step.

5. The method in accordance with claim 4, further comprising the step of:
  switching base station timing from the internal timing signal to the external timing signal a second predetermined time delay after the controlling step.

6. The method in accordance with claim 5, further comprising the step of:
  directing the portable communication unit to reenable audio transmitted to the user a third predetermined time delay after the switching step.

7. The method in accordance with claim 6, further comprising the steps of:
  disabling, concurrently with the controlling step, audio transmitted to the telephone system; and
  reenabling the audio transmitted to the telephone system concurrently with the directing step.

8. An apparatus in a radio base station for eliminating an audible noise burst after reestablishment of an external timing signal, the radio base station temporarily operating from an internal timing signal to provide digital communications over a radio link with a portable communication unit operated by a user, the base station also being coupled to a telephone system, the apparatus comprising:
  detection means for detecting the reestablishment of the external timing signal, the detection means comprising:
    receiving means for receiving an indication that the external timing signal is present;
    delay means coupled to the receiving means for delaying response for a first predetermined time delay after receiving the indication; and
    reconfirming means coupled to the delay means for reconfirming that the external timing signal is still present after the first predetermined time delay; and
  first control means coupled to the detection means for controlling the portable communication unit to disable audio transmitted to the user in response to reconfirming that the external timing signal is still present after the first predetermined time delay.

9. The apparatus in accordance with claim 8, further comprising:
  switching means coupled to the first control means for switching base station timing from the internal timing signal to the external timing signal a second predetermined time delay after the first control means controls the portable communication unit to disable the audio transmitted to the user.

10. The apparatus in accordance with claim 9, further comprising:
  second control means coupled to the switching means for controlling the portable communication unit to reenable audio transmitted to the user a third predetermined time delay after the switching means switches the base station timing to the external timing signal.

11. The apparatus in accordance with claim 10, further comprising:
  third control means coupled to the first control means for disabling the audio transmitted to the telephone system concurrently with disabling the audio transmitted to the user; and
  fourth control means coupled to the second control means for reenabling the audio transmitted to the telephone system concurrently with reenabling the audio transmitted to the user.

12. A telepoint base station for communicating with a portable communication unit, the telepoint base station comprising:
  a radio transceiver for establishing a radio link with the portable communication unit;
  a processor coupled to the transceiver for controlling the telepoint base station;
  a memory coupled to the processor for storing system software and operating variables;
  a telephone interface coupled to the radio transceiver for providing communications between the portable communication unit and a telephone system;
  an external timing port coupled to the processor for receiving an external timing signal;
  an internal timing signal generator coupled to the processor for generating an internal timing signal; and
  an apparatus for eliminating an audible noise burst after reestablishment of the external timing signal when the telepoint base station is temporarily operating from the internal timing signal to provide digital communications with the portable communication unit, the apparatus comprising:

an external timing signal detector for detecting the reestablishment of the external timing signal, the external timing signal detector comprising:
- a logic signal input element for receiving an indication that the external timing signal is present;
- a delay element coupled to the logic signal input element for delaying response for a first predetermined time delay after receiving the indication; and
- a reconfirmation element coupled to the delay element for reconfirming that the external timing signal is still present after the first predetermined time delay; and a first processor element coupled to the external timing signal detector for controlling the portable communication unit to execute a radio link reestablishment procedure in response to reconfirming that the external timing signal is still present after the first predetermined time delay.

13. The telepoint base station in accordance with claim 12, further comprising:
a switching element coupled to the first processor element for switching base station timing from the internal timing signal to the external timing signal a second predetermined time delay after the first processor element controls the portable communication unit to execute the radio link reestablishment procedure.

14. The telepoint base station in accordance with claim 12, further comprising:
a second processor element coupled to the first processor element for disabling audio transmitted to the telephone system concurrently with the first processor element controlling the portable communication unit to execute the radio link reestablishment procedure; and
a third processor element coupled to the second processor element for reenabling the audio transmitted to the telephone system concurrently with completion of the radio link reestablishment procedure.

* * * * *